(12) United States Patent
DeBlase et al.

(10) Patent No.: US 8,313,542 B2
(45) Date of Patent: *Nov. 20, 2012

(54) ANTIOXIDANT ADDITIVE FOR BIODIESEL FUELS

(75) Inventors: Frank J. DeBlase, Hopewell Junction, NY (US); Brian E. Fox, Monroe, CT (US); Cyril A. Migdal, Pleasant Valley, NY (US)

(73) Assignee: Chemtura Corporation, Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,282

(22) Filed: May 11, 2011

(65) Prior Publication Data

US 2011/0209390 A1 Sep. 1, 2011

Related U.S. Application Data

(63) Continuation of application No. 11/453,586, filed on Jun. 14, 2006, now Pat. No. 7,964,002.

(51) Int. Cl.
*C10L 1/22* (2006.01)
*C10L 1/18* (2006.01)

(52) U.S. Cl. .......... 44/412; 44/426; 44/432; 44/450

(58) Field of Classification Search .......... 44/412, 44/426, 432, 450
See application file for complete search history.

(56) References Cited

U.S. PATENT DOCUMENTS

| | | | |
|---|---|---|---|
| 1,906,935 A | 5/1933 | Horst | |
| 1,975,167 A | 10/1934 | Meuser | |
| 2,002,642 A | 5/1935 | Meuser | |
| 2,305,676 A | 12/1942 | Chenicek | |
| 2,333,294 A | 11/1943 | Chenicek | |
| 3,211,652 A | 10/1965 | Hinkamp | |
| 3,322,520 A | 5/1967 | Brimer et al. | |
| 3,556,748 A | 1/1971 | Stedman | |
| 3,689,513 A | 9/1972 | Cain et al. | |
| 4,648,885 A | 3/1987 | Reid | |
| 4,808,196 A | 2/1989 | Horodysky | |
| 5,169,410 A | 12/1992 | Wright | |
| 5,509,944 A | 4/1996 | Venkatadri et al. | |
| 5,711,767 A | 1/1998 | Gande et al. | |
| 5,834,544 A | 11/1998 | Lin et al. | |
| 6,096,695 A | 8/2000 | Lam et al. | |
| 6,409,778 B1 | 6/2002 | Auschra et al. | |
| 6,562,802 B2 | 5/2003 | Johansson et al. | |
| 6,764,542 B1 | 7/2004 | Lackey et al. | |
| 6,802,897 B1 | 10/2004 | Lackey et al. | |
| 6,979,426 B2 | 12/2005 | Teall et al. | |
| 2003/0093943 A1 * | 5/2003 | Jordan | 44/307 |
| 2006/0201056 A1 * | 9/2006 | Jordan | 44/307 |
| 2007/0113467 A1 * | 5/2007 | Abou-Nemeh | 44/388 |

OTHER PUBLICATIONS

Atmospheric Oxidation and Antioxidants, Gerald Scott, Elsevier Publishing, 1965, pp. 262-272.

* cited by examiner

*Primary Examiner* — Cephia D Toomer

(74) *Attorney, Agent, or Firm* — Joseph Suhadolnik

(57) ABSTRACT

A synergistic combination antioxidant mixture that provides excellent characteristics for biodiesel fuel compositions, when incorporated therein.

17 Claims, 3 Drawing Sheets

ANTIOXIDANT ADDITIVE FOR BIODIESEL FUELS

This application is a continuation of U.S. application Ser. No. 11/453,586, filed Jun. 14, 2006, now U.S. Pat. No. 7,964,002, the entire contents of which is incorporated herein by reference.

FIELD OF THE INVENTION

The present invention relates to fuel compositions comprising an antioxidant additive for hydrocarbon fuels, such as, biodiesel. More particularly, the present invention is directed to a fuel additive composition comprising a synergistic combination of antioxidant compounds for use in biodiesel fuel.

BACKGROUND OF THE INVENTION

Dependency on petroleum fuels has been an economic and environmental issue for some time. These factors have fostered the expansion of alternative fuels such as biodiesel.

Biodiesel is the name for a variety of ester-based oxygenated fuels made from vegetable oils, fats, greases, or other sources of triglycerides. It is a nontoxic and biodegradable substitute and supplement for petroleum diesel. Even in blends as low as 20% biodiesel to 80% petroleum diesel (B20), biodiesel can substantially reduce the emission levels and toxicity of diesel exhaust. Biodiesel has been designated as an alternative fuel by the United States Department of Energy and the United States Department of Transportation, and is registered with the United States Environmental Protection Agency as a fuel and fuel additive. It can be used in any diesel engine, without the need for mechanical alterations, and is compatible with existing petroleum distribution infrastructure.

Organic fuels, such as biodiesel, can include a wide variety of contaminants from different sources. For example, fuel frequently oxidizes and forms resinous materials such as varnishes commonly referred to as asphaltenes. As such, stability, especially by oxidative degradation, is a serious problem in hydrocarbon fuels. Biodiesel, as well as other hydrocarbon fuels, are known to form sticky deposits or gums both upon storage and under actual use conditions. These gummy residues can cause severe problems: for example, such deposits can cause valves to stick and such precipitates may cause filters to clog. These problems can adversely affect both the handling and combustion performance of the fuel. Among the different types of gasolines, pygas and cracked gasoline (both coker and FCC) are the most prone to oxidation and deposit formation.

Work in the area of organic fuel antioxidants has been performed over many years. One common class of antioxidants for this purpose is the phenylenediamines (PDA) used alone or in admixture with other materials. U.S. Pat. Nos. 3,322,520 and 3,556,748 teach that the phenylenediamine is usually N,N'-disubstituted with the substituents being either aliphatic or aromatic. U.S. Pat. No. 5,509,944 teaches that mixtures of PDA, hindered phenols and dimethyl surfoxide (DMSO) perform better than PDA alone. Phenylenediamines do not function well as stabilizers when the gasoline has a high acid number (>0.1 mg KOH/g gasoline). U.S. Pat. No. 5,169,410 teaches that the use of a strongly basic organic amine can, by preferentially reacting with acid moieties, increase the oxidative stabilizing efficacy of phenylenediamine.

U.S. Pat. Nos. 2,305,676 and 2,333,294 demonstrate that the use of N-substituted p-aminophenol derivatives and certain polyamines are effective in oxidative stabilization of a variety of gasolines. U.S. Pat. No. 4,648,885 discloses that a mixture of polyamines and N,N-diethylhydroxylamine is an effective stabilizer for distillate fuel oils.

However, despite these efforts to prevent the oxidative degredation of biodiesel and other organic fuels there remains a need to stabilize biodiesel more effectively.

SUMMARY OF INVENTION

The present invention is directed to a composition comprising biodiesel and an antioxidizing effective amount of a mixture of at least one aromatic diamine and at least one sterically hindered phenol.

The present invention is further directed to a method for inhibiting the oxidation of biodiesel which comprises adding to a biodiesel fuel an antioxidizing effective amount of a mixture of at least one aromatic diamine and at least one sterically hindered phenol.

The synergetic fuel additive composition of the present invention effectively stabilizes biodiesel fuels against oxidative degradation and deposit formation.

DETAILED DESCRIPTION OF THE INVENTION

Figure 1:
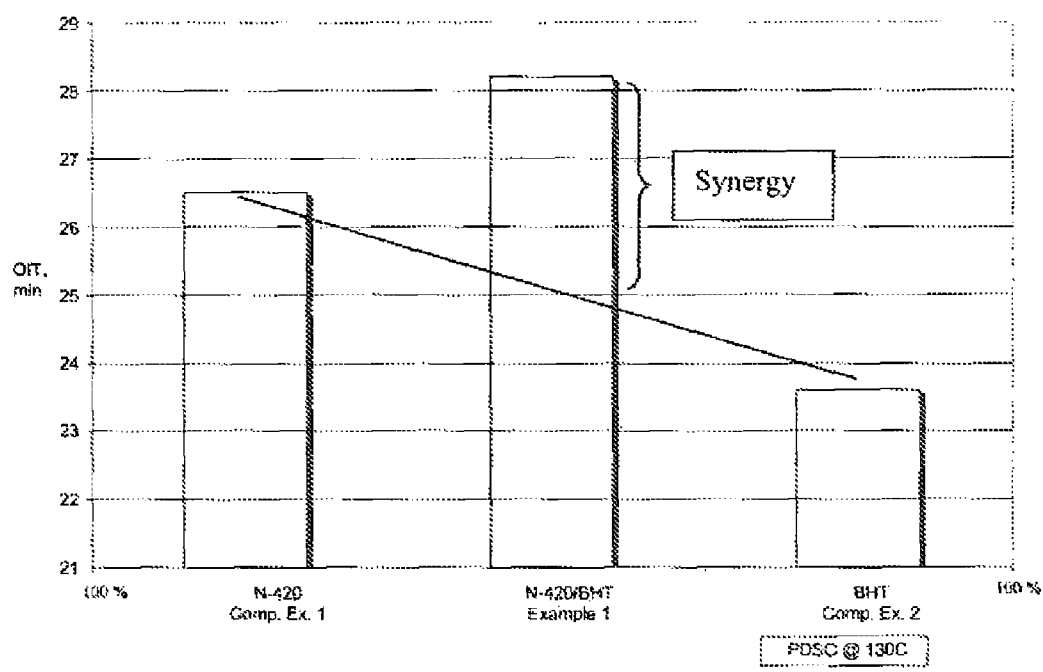
FIG. 1 is a graphical representation of the Oxidation Induction Time (OIT) for Comparative Examples 1 and 2 and Example 1.

It has now been found as disclosed more specifically hereinbelow that certain aminic antioxidants in combination with phenolic antioxidants, possess synergistic antioxidant activity in biodiesel fuel.

The present invention is a composition comprising biodiesel and an antioxidizing effective amount of a mixture of at least one aromatic diamine and at least one sterically hindered phenol.

As used herein the term "fuel" means any petroleum fuels and organic liquids, e.g., gasoline, diesel and biodiesel fuel, or jet fuel and the like.

The term "antioxidant" as used herein is an organic compound added to fuels, e.g., biodiesel, gasoline and the like, to retard oxidation, deterioration, degradation and gum formation. The term "stabilizer" as used herein is a compound, like an antioxidant, that can be used to keep fuels from changing their chemical nature. Antioxidants in fuels stored for long periods act in a stabilizing capacity, i.e., preventing insoluble oxidation products from forming and settling out, as such, fuels remain clear and bright, or stable. Furthermore, antioxidants added at the point of manufacture, at elevated temperatures, can act as scavengers preventing thermal induced free radical formation. For purposes of this disclosure antioxidants are inclusive of stabilizing compounds.

Biodiesel is fuel made from natural, renewable sources, such as new and used vegetable oils and animal fats, for use in diesel engines. Biodiesel has physical properties very similar to petroleum-derived diesel fuel, but its emission properties are superior. Using biodiesel in a conventional diesel engine substantially reduces emissions of unburned hydrocarbons, carbon monoxide, sulfates, polycyclic aromatic hydrocarbons, nitrated polycyclic aromatic hydrocarbons, and particulate matter. Diesel blends containing up to 20% biodiesel can be used in nearly all diesel-powered equipment, and higher-level blends and pure biodiesel can be used in many engines with little or no modification. Lower-level blends are compatible with most storage and distribution equipment, but special handling is required for higher-level blends.

Biodiesel is made from oils or fats, which are hydrocarbons. Fresh soybean oil is commonly used, although biodiesel can be made from mustard seed oil or waste vegetable oil (such as used oil from restaurant deep fryers). These hydrocarbons are filtered and mixed with an alcohol, such as methanol, and a catalyst (sodium hydroxide or potassium hydroxide), resulting in a chemical reaction whose major products are the biodiesel fuel and glycerol.

Biodiesel is made primarily from two triglyceride oil sources through a transesterification reaction with methanol. These sources are soybean based, sometimes called soydiesel, methyl soyate, or soy-methyl ester (SME), and rapeseed oil based methyl esters (RME). The starting oil is reacted with methanol, typically through the use of a catalyst (base catalyzed (Na or K-Methoxide) or Bronstead acid catalyzed (alkyl sulfonic or sulfuric acid)). The transesterification reaction forms the soy methyl esters (SME) or (RME) and free glycerin which is allowed to settle and is then subsequently removed. The United States is an abundant producer of (SME), approximately 75 million gallons in 2005, while the United Kingdom and Germany in particular are increasing their production of rapeseed oil biodiesel. Germany alone has increased their production to 2 million tons in 2006. In addition to soybean and rapeseed other sources of triglyceride starting oils can include: Mustard Seed Oil, Canola oil, Tallow (animal based), etc. Any triglyceride can be converted to its methyl ester by this process and used as a biodiesel if economically feasible.

The biodiesel of the present invention can advantageously be derived from any source that is capable of producing ester-based oxygenated fuels.

The composition according to the present invention comprises at least one aromatic amine antioxidant of the general formula (I),

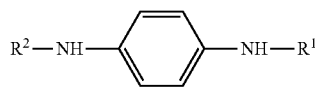

(I)

Wherein $R^1$ and $R^2$ of aromatic amine can be alkyl (i.e., aliphatic or aromatic) groups or $R^1$ and $R^2$ of aromatic amine can be selected from the group consisting of phenyl, sec-butyl, isopropyl, 1,4-dimethylbutyl, 1,3-dimethylbutyl, and 1,4, dimethylpentyl, and mixtures thereof.

In one embodiment of the present invention, the amine antioxidants include oil-soluble aromatic secondary amines; aromatic secondary monoamines; and others such as tertiary aliphatic amines are suitable. In another embodiment of the present invention, suitable aromatic secondary monoamines include diphenylamine, alkyl diphenylamines containing 1 to 2 alkyl substituents each having up to about 16 carbon atoms, phenyl-α-naphthylamine, alkyl- or aralkyl substituted phenyl-α-naphthylamine containing one or two alkyl or aralkyl groups each having up to about 16 carbon atoms, alkyl- or aralkyl-substituted phenyl-α-naphthylamine containing one or two alkyl or aralkyl groups each having up to about 16 carbon atoms, alkylated p-phenylene diamines available from Goodyear, under the tradename "Wingstay 100," and from Chemtura, and similar compounds.

In yet another embodiment of the invention, useful amines include alkylated (p)-phenylene diames, such as, N,N'-diisopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-dicyclohexyl-p-phenylenediamine; N,N'-di(2-naphthyl)-p-phenylenediamine; 4-(p-toluenesulfonamido)diphenylamine; N,N'-dimethyl-N,N'-di-see-butyl-p-phenylenediamine; 4-n-butylaminophenol; 4-butyrylaminophenol; 4-nonanoylaminophenol; 4-dodecanoylaminophenol; 4-octadecanoylaminophenol; 2,6-di-tert-butyl-4-dimethylaminomethylphenol; 2,4'-diaminodiphenylmethane; 4,4'-diaminodiphenylmethane; N,N,N', N'-tetramethyl-4,4'-diaminodiphenylmethane; 1,2-di[(2-methylphenyl)amino]ethane; 1,2-di(phenylamino)propane(o-tolyl)biguanide di[4-(1',3'-dimethylbutyl)phenyl]amine; 2,3-dihydro-3,3-dimethyl-4H-1,4-benzothiazine; phenothiazine; N-allylphenothiazine, N,N'-dioctyl-p-phenylenediamine; N,N'-di-sec-butyl-o-phenylenediamine; triethylenetetraamine-di-(monononylphenolate); N-secbutyl, N'-phenyl-o-phenylenediamine and mixture thereof.

Other useful amine antioxidants are the reaction products of a diarylamine and an aliphatic ketone. The diarylamine aliphatic ketone reaction products which are useful herein are disclosed in U.S. Pat. Nos. 1,906,935; 1,975,167; 2,002,642 and 2,562,802. Briefly described, these products are obtained by reacting a diarylamine, preferably a diphenylamine, which may or may not possess one or more substituents on either aryl group with an aliphatic ketone, preferably acetone, in the presence of a suitable catalyst. In addition to diphenylamine, other suitable diarylamine reactants include dinaphthyl amines, p-nitrodiphenylamine, 2,4-dinitrodiphenylamine, p-aminodiphenylamine; p-hydroxydiphenylamine, etc. Besides acetone, other useful ketone reactants include methylethylketone, diethylketone, monochloroacetone, dichloroacetone, and the like.

The synergistic mixture of antioxidants includes at least one sterically hindered phenolic antioxidant of the general formula (II),

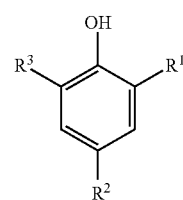

(II)

Wherein $R^1$, $R^2$ and $R^3$ of the sterically hindered phenol can be alkyl (i.e., aliphatic or aromatic) groups or $R^1$, $R^2$ and $R^3$ of the sterically hindered phenol can be selected from the group consisting of H, tert-butyl, OH, $OCH_3$, and methylphenyl and mixtures thereof.

In one embodiment of the invention, the phenolic antioxidants include, e.g., sterically hindered phenolic antioxidants, such as, ortho-alkylated phenolic compounds which include 2,6-di-tertbutylphenol, 4-methyl-2,6-di-tert-butylphenol, 2,4,6-tri-tertbutylphenol, 2-tert-butylphenol, 2,6-diisopropylphenol, 2-methyl-6-tert-butylphenol, 2,4-dimethyl-6-tert-butylphenol, 4-(N,N-di-methylaminomethyl)-2,6-di-tert-butylphenol, 4-ethyl-2,6-di-tertbutylphenol, 2-methyl-6-styrylphenol, 2,6-di-styryl-4-nonylphenol, and their analogs and homologs. One or more partially sulfurized phenolic compounds as described in U.S. Pat. No. 6,096,695, the disclosure of which is incorporated herein by reference; methylene-bridged alkylphenols as described in U.S. Pat. No.

3,211,652, the disclosure of which is incorporated herein by reference. In another embodiment of the invention, suitable phenolic antioxidants include alkylated monophenols such as 2-tert-butyl-4,6-dimethylphenol; 2,6-di-tert-butyl-4-ethylphenol; 2,6-di-tert-butyl-4-n-butylphenol; 2,6-di-tert-butyl-4-iso-butylphenol; 2,6-di-cyclopentyl-4-methylphenol; 2-(.alpha.-methylcyclohexyl)-4,6-dimethylphenol; 2,6-di-octadecyl-4-methylphenol; 2,4,6-tri-cyclohexylphenol; 2,6-di-tert-butyl-4-methoxymethylphenol, 3-tert butyl-4-hydroxyanisole (BHA); and o-tert-butylphenol. Alkylated hydroquinones, such as 2,6-di-tert-butyl-4-methoxyphenol; 2,5-di-tert-butylhydroquinone; 2,5-di-tert-amylhydroquinone; and 2,6-diphenyl-4-octadecyloxyphenol tert-butyl hydroquinone (TBHQ). Hydroxylated thiodiphenyl ethers such as 2,2'-thio-bis(6-tert-butyl-4-methylphenol); and 2,2'thio-bis(4-octylphenol). Alkylidene bisphenols such as 2,2'-methylene-bis(6-tert-butyl-4-methylphenol); 2,2'-methylene-bis(6-tert-butyl-4-ethylphenol); 2,2'-methylene-bis[4-methyl-6-(.alpha.-methylcyclohexyl)phenol]; 2,2'-methylene-bis(4-methyl-6-cyclohexylphenol); 2,2'-methylene-bis(6-nonyl-4-methylphenol); 2,2'-methylene-bis(4,6-di-tert-butylphenol); 2,2'-ethylidene-bis(4,6-di-tert-butylphenol); 2,2'-ethylidene-bis(6-tert-butyl-4-isobutylphenol or -5-isobutylphenol); 2,2'-methylene-bis[6-(.alpha.-methylbenzyl)-4-nonylphenol]; 2,2'-methylene-bis[6-(.alpha.,.alpha.-dimethylbenzyl)-4-nonylphenol]; 4,4'-methylene-bis(2,6-di-tert-butylphenol); 4,4'-methylene-bis(6-tert-butyl-2-methylphenol); 1,1-bis(5-tert-butyl-4-hydroxy-2-methylphenyl)butane; 2,6-di(3-tert-butyl-5-methyl-2-hydroxybenzyl)-4-methylphenol; 1,1,3-tris(5-tert-butyl-4-hydroxy-2-methylphenyl)-3-n-dodecylmercaptobutane; ethylene glycol bis[3,3-bis(3'-tert-butyl-4'-hydroxyphenyl)butyrate]; bis(3-tert-butyl-4-hydroxy-5-methylphenyl)dicyclopentadiene; and bis[2-(3'-tert-butyl-2'-hydroxy-5'-methylbenzyl)-6-tert-butyl-4-methylphenyl]terephthalate.
Benzyl compounds such as 1,3,5-tris(3,5-di-tert-butyl-4-hydroxybenzyl)-2,4,6-trimethylbenzene; bis(3,5-di-tert-butyl-4-hydroxybenzyl)sulfide; bis(4-tert-butyl-3-hydroxy-2,6-dimethylbenzyl)dithiol terephthalate; 1,3,5-tris(3,5-di-tert-butyl-4-hydroxybenzyl)isocyanurate; 1,3,5-tris(4-tert-butyl-3-hydroxy-2,6-dimethylbenzyl)isocyanurate; dioctadecyl 3,5-di-tert-butyl-4-hydroxybenzylphosphonate; and monoethyl 3,5-di-tert-butyl-4-hydroxybenzylphosphonate calcium salt. Acylaminophenols such as 4-hydroxylauranilide; 4-hydroxystearanilide; 2,4-bis-octylmercapto-6-(3,5-di-tert-butyl-4-hydroxyanilino)-s-triazine; and octyl N-(3,5-di-tert-butyl-4-hydroxyphenyl)carbamate. In addition, naturally occurring antioxidants such as, for example, vitamin E, ascorbic and citric acid.

In yet another embodiment of the invention, the synergistic mixture of antioxidants is a blend of aromatic amine antioxidant, hindered phenolic antioxidant and/or a polyhydroxy phenolic antioxidant. The polyhydroxy phenolic antioxidants of the present invention have the following general formula (III)

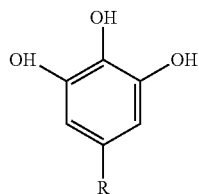

(III)

Wherein R is selected from the group consisting of H (e.g., Pyrogallol®), alkyl, COOH and COOR$^4$ wherein R$^4$ is e.g., n-propyl ester, propyl ester of gallic acid (propyl galate), octyl ester of gallic acid (octyl gallate), dodecyl ester of gallic acid (dodecyl gallate), or other fatty acid esters of gallic acid and the like.

Suitable polyhydroxy phenolic antioxidant include esters of gallic acid, such as propyl gallate, octyl gallate, and dodecyl gallate; nordihydroguaiaretic acid (2,3-dimethyl-1,4-his (3,4-dihydroxyphenyl)butane); 2,4,5-trihydroxybutyrophenone; p-tert-butyl cathechol, cathechol, and the like.

Typically the amine and phenolic compounds of the present invention are prepared as known in the art. For example, the synthesis of a diamine such as N,N'-di-sec-butyl-p-phenylenediamine involves the reaction of p-nitro aniline (PNA) with the appropriate ketone and reduction to the alkylated diamine, or using catalytic hydrogenation of a mixture of p-nitro, p-amino and aldehyde or ketone as disclosed in U.S. Pat. No. 3,689,513, incorporated herein by reference, and as presented in the following reaction:

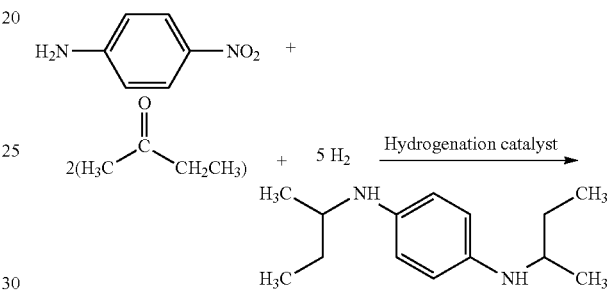

A typical commercial synthetic route for the preparation of hindered phenols of the present invention, as disclosed in An Introduction to Industrial Organic Chemistry, P. Wiseman, 2$^{nd}$ Ed., Elsevier Applied Science, New York 1979, and incorporated herein by reference, is the alkylation of p-creasol to yield 4-methyl-2,6-di-tert-butylphenol (BHT) based upon alkylation of p-creasol with isobutane at 40-45° C. in the presence of 0.1% $H_2SO_4$ to give BHT; and presented in the following reaction:

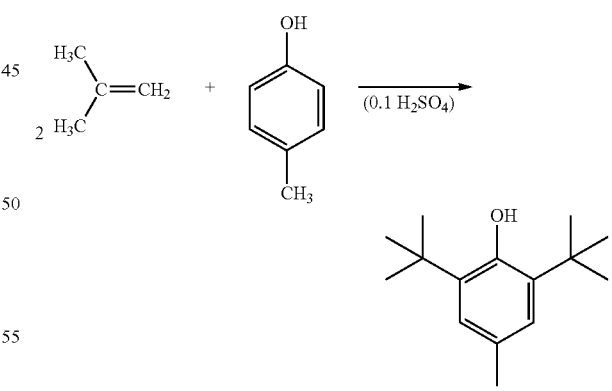

In one embodiment of the present invention, the mixture of aromatic amine and sterically hindered phenolic antioxidants contains from about 10 to about 90 percent by weight of the mixture amine antioxidant and from about 90 to about 10 percent by weight of the mixture phenolic antioxidant, and in another embodiment of the invention the mixture contains from about 15 to about 85 percent by weight of the mixture amine antioxidant and from about 85 to about 15 percent by weight of the mixture phenolic antioxidant. In still another embodiment of the invention, the mixture contains from about 20 to about 80 percent by weight of the mixture amine antioxidant and from about 80 to about 20 percent by weight of the mixture phenolic antioxidant.

In an embodiment of the present invention the mixture of aromatic amine and sterically hindered phenolic antioxidants have a ratio of aromatic amine to hindered phenol of from about 1:9 to about 9:1 by weight. In another embodiment the mixture has a ratio of aromatic amine to hindered phenol of from about 1:4 to about 4:1 by weight, and according to another embodiment the mixture has a ratio of aromatic amine to hindered phenol of from about 1 to about 1 by weight.

In another embodiment of the invention, the mixture of aromatic amine and sterically hindered phenolic antioxidants is present in the biodiesel fuel in an amount from about 1 to about 10,000 ppm, and in another embodiment from about 50 to about 5,000 ppm, and according to still another embodiment the mixture of antioxidants is present in the biodiesel fuel from about 100 to about 2,000 ppm.

The biodiesel fuel of the present invention along with the antioxidant mixture can optionally comprises one or more additives as known in the art. Optional additives include supplemental dispersants/detergents, octane improvers, cetane improvers, carrier fluids, demulsifiers, antifoam agents, anti-icing additives, biocides, combustion improvers, alkali or alkaline-earth metal detergents, drag reducers, metal deactivators, lubricity additives, dyes, markers, odor masks, odorants and stability improvers in amounts known and convention to those skilled in the art.

The present invention further comprises a method for inhibiting the oxidation of biodiesel which comprises adding to a biodiesel fuel an antioxidizing effective amount of a mixture of at least one aromatic diamine and at least one sterically hindered phenol. The method can further comprise adding a polyhydroxy phenolic compound, e.g., gallic antioxidant, to the aromatic amine or mixture.

The additive composition of the present invention is added to biodiesel by known and conventional means which typically minimize neat additive oxidation.

EXAMPLES

All Examples (i.e., Comparative Examples and Examples) were subjected to Pressure Differential Scanning calorimetry (PDSC) at 130° C. Each Example and Comparative Example was placed in a differential scanning calorimeter cup and placed in the oxygen filled PDSC chamber. The Examples and Comparative Examples were then heated to 130° C. Upon reaching 130° C. they were kept isothermal at that temperature and heat flow monitored until oxidation was reached. When oxidation occurred there was an exothermic release of heat that was recorded by the PDSC. The difference in measured elapsed time between the starting point (i.e., when the Examples and Comparative Examples reached 130° C.) and the ending point (onset of the exothermic peak), is the Oxidation Induction Time (OIT). The OIT is an indication of the Examples and Comparative Examples tendency to undergo oxidation. Antioxidants increase the Oxidation Induction Time, and thereby add storage stability and temperature stability to the product.

Example 1 was prepared with a 1:1 mixture by weight of N-phenyl-N'-alkyl-p-phenylenediame ((NL 420) which comprises a blend of 12-88% N-(1,4-dimethylbutyl)-N'-phenyl-1,4-phenylenediamine and 88-12% N-(1,3-dimethylbutyl)-N'-phenyl-1,4 phenylenediamine) and 2,6-ditertbutyl-4-methyl phenol (BHT) added to rapeseed-ME (Methyl Ester of Rapeseed oil (RME)) biodiesel at a treat rate of 1000 PPM (w/w). Comparative Example 1 was prepared by adding NL 420 to rapeseed-ME biodiesel at a treat rate of 1000 PPM (w/), and Comparative Example 2 was prepared by adding BHT to rapeseed-ME biodiesel at a treat rate of 1000 PPM (w/w). The antioxidancy of Comparative Examples 1 and 2 and Example 1 was measured using Pressure Differential Scanning calorimetry (PDSC), which calculates the induction time for oxidation of the rapeseed-ME biodiesel compositions. The results are presented in FIG. 1.

As displayed in FIG. 1, the induction of oxidation time for Comparative Examples 1 and 2, was 26.5 minutes and 23.6 minutes, respectively. The synergistic antioxidative effect of N-phenyl-N'-alkyl-p-phenylenediame (NL 420) and 2,6-di-tertbutyl-4-methyl phenol was demonstrated by an inducement time of 28.2 minutes, an 6.4% and 19.5% increase over Comparative Examples 1 and 2, respectively. The average of Comparative Examples 1 and 2 is 25. The synergistic blend gave an increase of induction time equal to a (28.2−25)/25× 100=12.8% improvement.

Example 2 was prepared with a 1:1 mixture by weight of N-phenyl-N'-alkyl-p-phenylenediame (N-420) and 1,2,3-trihydroxybenzene (Pyrogallol available from Aldrich Chemical Co.) added to rapeseed-ME (Methyl Ester of Rapeseed oil) biodiesel at a treat rate of 1000 PPM (w/w). Comparative Example 3 was prepared by adding N-420 to rapeseed-ME biodiesel at a treat rate of 1000 PPM (w/), and Comparative Example 4 was prepared by adding Pyrogallol to rapeseed-ME biodiesel at a treat rate of 1000 PPM (w/w). The antioxidancy of Comparative Examples 3 and 4 and Example 2 was measured using Pressure Differential Scanning calorimetry (PDSC). The results are presented in FIG. 2.

Figure 2:
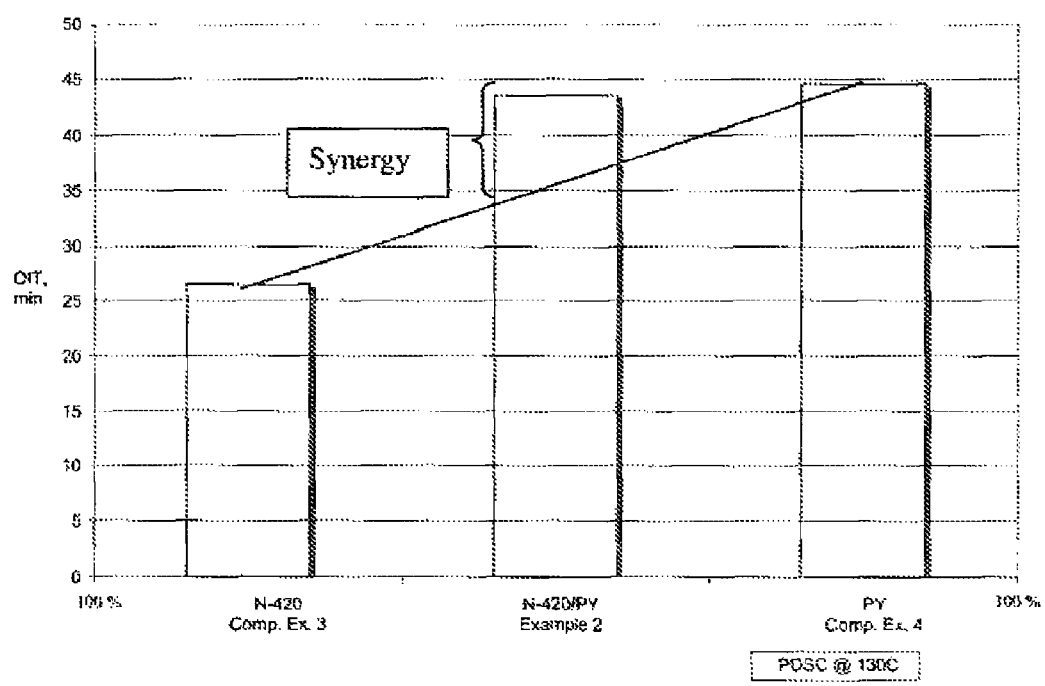
FIG. 2 is a graphical representation of the Oxidation Induction Time (OIT) for Comparative Examples 3 and 4 and Example 2.

As displayed in FIG. 2, the induction of oxidation time for Comparative Examples 3 and 4, was 25.3 minutes and 44.85 minutes, respectively. Example 2 displayed a synergistic antioxidative response and had an induction time of 43.7 minutes, which was 73% and negative (−) 2% increase over the Comparative Examples 3 and 4, respectively. The average of Comparative Examples 3 and 4 is 35. The synergistic blend then gave an increase of induction time equal to a (43.7−35)/35× 100=24.8% improvement.

Example 3 was prepared with a 1:1 mixture by weight of N-phenyl-N'-alkyl-p-phenylenediame (N-420) and 1,2,3-trihydroxybenzene (Pyrogallol available from Aldrich Chemical Co.) added to rapeseed-ME (Methyl Ester of Rapeseed oil) biodiesel at a treat rate of 1000 PPM (w/w). Comparative Example 5 was prepared by adding N-420 to rapeseed-ME biodiesel at a treat rate of 1000 PPM (w/w), and Comparative Example 6 was prepared by adding Pyrogallol to rapeseed-ME biodiesel at a treat rate of 1000 PPM (w/w). The antioxidancy of Comparative Examples 5 and 6 and Example 3 was measured using the Rancimat EN 14112 Oxidation Test which measures the oxidation induction time at 110° C. This test is the standard test used for vegetable oils typically performed in Europe. The results are presented in FIG. 3.

Figure 3:
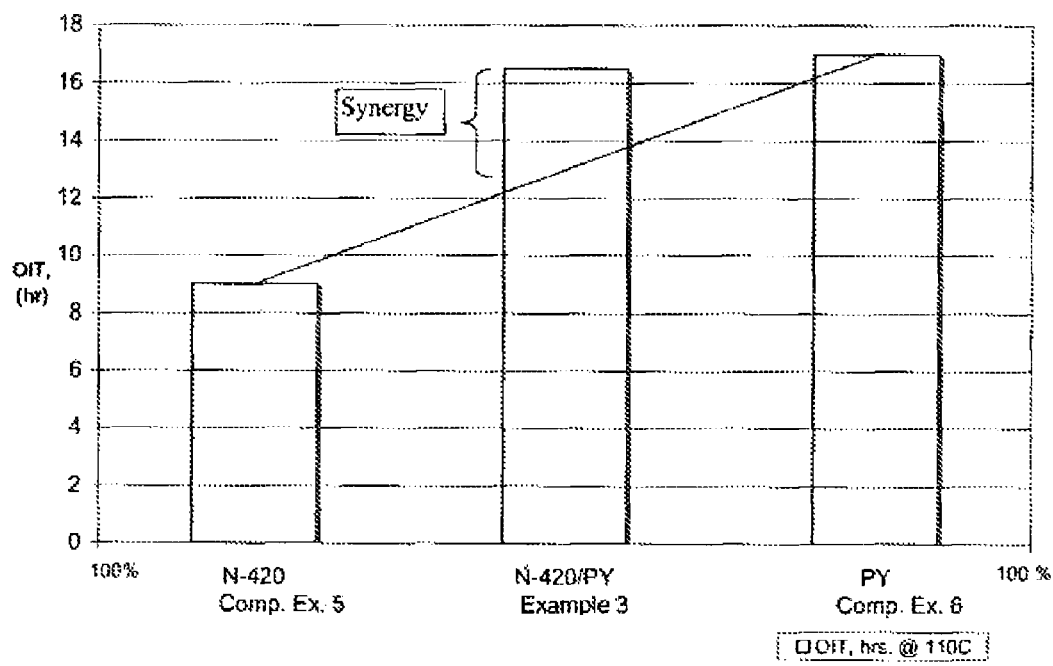
FIG. 3 is a graphical representation of the Oxidation Induction Time (OIT) for Comparative Examples 5 and 6 and Example 3.

As displayed in FIG. 3, the induction of oxidation time for Comparative Examples 5 and 6, was 9 hours and 17 hours, respectively. Example 3 displayed a synergistic antioxidative response and had an induction time of 16.5 hours, which was 83.3% and negative (−) 3% increase over the Comparative Examples 5 and 6, respectively. The average of Comparative Examples 5 and 6 is 13. The synergistic blend then gave an increase of induction time equal to a (16.5−13)/13× 100=26.9% improvement.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

We claim:

1. A composition comprising
   (a) a biodiesel fuel and
   (b) an antioxidizing effective amount of a mixture of
      (i) at least one aromatic diamine selected from N,N'-di-isopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-dicyclohexyl-p-phenylenediamine; N,N'-dioctyl-p-phenylenediamine;
      (ii) at least one hindered phenol selected from 2,6-di-tert-butylphenol; 4-methyl-2,6-di-tert-butylphenol; 2,4,6-tri-tert-butylphenol; 2-tert-butylphenol; 2,6-di-isopropylphenol; 2-methyl-6-tert-butylphenol; 2,4-dimethyl-6-tert-butylphenol; 4-ethyl-2,6-di-tert-butylphenol; 2-methyl-6-styrylphenol; 2,6-di-styryl-4-nonylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-iso-butylphenol; 2,6-di-cyclopentyl-4-methylphenol; 2-(α-methylcyclohexyl)-4,6-dimethylphenol; 2,6-di-octadecyl-4-methylphenol; 2,4,6-tri-cyclohexylphenol; and
      (iii) at least one polyhydroxy phenol of general formula (III)

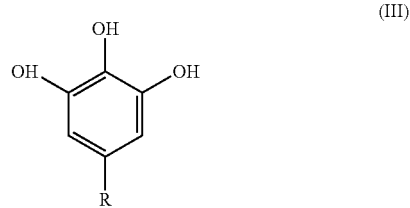

wherein R is selected from the group consisting of H, alkyl, COOH and COOR$^4$ wherein R$^4$ is propyl, octyl or dodecyl;
wherein the mixture of aromatic amine, hindered phenol and polyhydroxy phenol have a ratio of from about 1:4 to about 4:1 by weight of aromatic amine to hindered phenol plus polyhydroxy phenol.

2. The composition according to claim 1 wherein the at least one hindered phenol is selected from 4-methyl-2,6-di-tert-butylphenol; 2,4,6-tri-tertbutylphenol; 2-methyl-6-tert-butylphenol; 2,4-dimethyl-6-tert-butylphenol; 2-tert-butyl-4,6-dimethylphenol; 2,6-di-tert-butyl-4-ethylphenol and 2,6-di-tert-butyl-4-n-butylphenol.

3. The composition of claim 1 wherein the mixture (b) has a ratio of aromatic amine (i) to hindered phenol (ii) plus polyhydroxy phenol (iii) of about 1 to about 1 by weight.

4. The composition of claim 1 wherein the mixture (b) has a ratio of aromatic amine (i) to hindered phenol (ii) plus polyhydroxy phenol (iii) of from about 1:1 to about 4:1 by weight.

5. The composition of claim 2 wherein the mixture (b) has a ratio of aromatic amine (i) to hindered phenol (ii) plus polyhydroxy phenol (iii) of about 1 to about 1 by weight.

6. The composition of claim 1 wherein the mixture (b) has a ratio of aromatic amine (i) to hindered phenol (ii) plus polyhydroxy phenol (iii) of from about 1:1 to about 4:1 by weight.

7. The composition of claim 1 wherein the aromatic diamine of the mixture (b) is a blend of N-(1,4-dimethylbutyl)-N'-phenyl-1,4-phenylenediamine and N-(1,3-dimethylbutyl)-N'-phenyl-1,4 phenylenediamine), and the sterically hindered phenol of the mixture (b) is 2,6-di-tertbutyl-4-methyl phenol.

8. The composition of claim 1 wherein the mixture (b) is present in the biodiesel fuel in an amount of about 1 to about 10,000 ppm.

9. The composition of claim 8 wherein the mixture (b) is present in the biodiesel fuel in an amount from about 50 to about 5,000 ppm.

10. The composition of claim 9 wherein the mixture (b) is present in the biodiesel fuel in an amount from about 100 to about 2,000 ppm.

11. The composition of claim 1 further comprising at least one other component selected from dispersants/detergents, octane improvers, carrier fluids, demulsifiers, antifoam agents, anti-icing additives, biocides, combustion improvers, alkali or alkaline-earth metal detergents, drag reducers, metal deactivators, lubricity additives, dyes, markers, odor masks, odorants and stability improvers.

12. The composition of claim 2 wherein the mixture (b) is present in the biodiesel fuel in an amount of about 1 to about 10,000 ppm.

13. The composition of claim 12 wherein the mixture (b) is present in the biodiesel fuel in an amount from about 50 to about 5,000 ppm.

14. The composition of claim 13 wherein the mixture (b) is present in the biodiesel fuel in an amount from about 100 to about 2,000 ppm.

15. The composition of claim 2 further comprising at least one other component selected from dispersants/detergents, octane improvers, carrier fluids, demulsifiers, antifoam agents, anti-icing additives, biocides, combustion improvers, alkali or alkaline-earth metal detergents, drag reducers, metal deactivators, lubricity additives, dyes, markers, odor masks, odorants and stability improvers.

16. The composition of claim 1 wherein the biodiesel fuel comprises methyl esters of soybean oil, mustard seed oil, rapeseed oil, canola oil or tallow.

17. The composition of claim 2 wherein the biodiesel fuel comprises, methyl esters of soybean oil, mustard seed oil, rapeseed oil, canola oil or tallow.

* * * * *